3,536,643
POLYETHYLENE EMULSION PROCESS
Harry K. Stryker, Overland Park, Kans., Gerald J. Mantell, Allentown, Pa., and Thomas R. Hopkins, Overland Park, Kans., assignors, by mesne assignments, to Cosden Oil & Chemical Company, Big Spring, Tex., a corporation of Delaware
No Drawing. Filed Sept. 1, 1967, Ser. No. 664,923
Int. Cl. C08f 1/13; C09g 1/04
U.S. Cl. 260—23    8 Claims

ABSTRACT OF THE DISCLOSURE

Stable aqueous dispersions of polyethylene of controlled molecular weight are obtained by polymerizing ethylene in an aqueous medium employing an emulsifier comprising a salt of a perfluoro fatty acid.

BACKGROUND OF THE INVENTION

This invention relates to the preparation of stable aqueous dispersions of polyethylene. In another aspect, this invention relates to the preparation of aqueous dispersions of high molecular weight polyethylene. In yet another aspect, this invention relates to the emulsion polymerization of ethylene to obtain a polyethylene of controlled polymer chain length. In yet a further aspect, this invention relates to the emulsion polymerization of ethylene wherein the degree of chain transfer activity is controlled through the use of novel emulsifying agents.

It is known that aqueous dispersions of solid ethylene polymers can be obtained by polymerizing ethylene at elevated temperatures and pressures in an aqueous reaction medium containing an emulsifying agent and an initiator. The resultant emulsions contain polyethylene characterized by sufficiently high degrees of toughness, durability and hardness to adapt emulsions for a variety of uses, as for example in floor polishing compositions. However, there is a characteristic difference between polyethylene polymerized in emulsion systems and in conventional high pressure processes in that the emulsion-formed polymers have generally reduced mechanical properties of toughness, durability and hardness, e.g., lower tensile strength, and a much lower elongation of break. This difference appears to be due to a relatively large percent of low molecular weight polymer formed in the emulsion polymerization system.

As the mechanical properties are, in general, directly related to molecular weight, attempts heretofore to upgrade the mechanical properties of these emulsion-formed polymers involved modification of the process to obtain higher molecular weight polymers. Use of conventional emulsifying agents containing active hydrogens in the preparation of the aqueous dispersions of polyethylene results in the polyethylene radical chain transferring with the emulsifier. This chain transfer results in the formation of shorter polymer chains and lower molecular weight polyethylene.

SUMMARY OF THE INVENTION

In the emulsion polymerization of ethylene to produce a stable aqueous dispersion of polyethylene, polymer chain length and chain transfer activity are controlled by employing a salt of a perfluoro fatty acid as the emulsifying agent. Additionally, the salt of the perfluoro fatty acid can be recovered from the polyethylene aqueous dispersion by adding a nonionic emulsifying agent to the aqueous dispersion and passing the resultant admixture through an ion exchange zone to recover therefrom the salt of the perfluoro fatty acid. The product of the ion exchange process step is a stable aqueous dispersion of polyethylene containing a long-chain polymer and a nonionic emulsifying agent.

It is also within the scope of this invention to employ in the emulsification of ethylene other conventional emulsifying agents in combination with the salt of a perfluoro fatty acid, thereby controlling the degree of chain transfer activity to produce the desired average degree of ethylene polymerization.

DESCRIPTION OF THE INVENTION

Stable aqueous dispersions of polyethylene are obtained according to the invention in batch or continuous polymerization systems by the polymerization of ethylene in an aqueous medium employing conventional polymerization temperatures and pressures. Normally, ethylene is polymerized under a pressure extending from about 1550 p.s.i. to about 4500 p.s.i., and preferably, in the range of 1550 to 3000 p.s.i. Polymerization temperatures in the range of 70 to 90° can be suitably employed in the polymerization zone.

The ethylene polymerization is conducted in the presof a free redacial initiator comprising a water-soluble salt of persulfuric acid. Suitable initiators are selected from the ammonium and alkali metal salts of persulfuric acid. Of the water-soluble persulfates employed the potassium salt is preferred, and is used in amounts effective to initiate the polymerization, generally in the range of about 0.1 to 0.45 part per 100 parts of water in the aqueous polymerization medium. All quantities hereafter employed in the description of the invention are to be considered as parts by weight, unless otherwise specified.

Although the polymerization of ethylene proceeds over a wide pH range of about 2.0 to 12.0, it is preferred to operate at a pH above at least about 8.5. Alkaline substances giving a pH of about 10.5 are, for example, potassium phosphates, such as tripotassium phosphate and potassium carbonate, which substances are also buffers to give the desired pH values. Tripotassium phosphate, for example, is added to the aqueous medium in amounts between about 0.25 percent and 0.7 percent by weight. A pH in the range of 10–11 has been found to be particularly suitable and this pH range can be maintained by incorporating, for example, a small quantity of potassium hydroxide in the charge to the polymerization zone. Generally, the amount of potassium hydroxide utilized will be in the range from about 0.018 to about 0.1 part per 100 parts of water present in the polymerization system.

Optionally, although not required, the access of ethylene to the emulsified growing polymer can be facilitated by the addition of tertiary butyl alcohol. Such addition of tertiary butyl alcohol has been found to assist in the early attainment of equilibrium conditions in the polymerization zone. Tertiary butanol can be employed in the aqueous polymerization medium in amounts of up to about 25 percent by weight. T-butanol can be recovered from the polymerization reactor product by heating the aqueous dispersion to an elevated temperature (up to about 60° C.) at subatmospheric pressure to evaporate the alcohol. Pressures of about 10–100 mm. Hg are suitably employed.

The emulsifier employed in preparation of the stable aqueous dispersions of polyethylene is a salt of a perfluoro fatty acid having at least 6 carbon atoms per molecule. Although not to be limited thereto, potassium perfluorooctanoate has been found to be particularly effective in the emulsion polymerization of ethylene. The emulsifying agent is employed in an amount less than about 9 percent by weight of the aqueous phase in the polymerization zone, suitably between about 0.9 and about 9.0 percent by weight. The emulsifier can be added to the aqueous phase as a salt or in the form of alkali and acid components in quantities suitable for in situ formation of the salt.

Residence time in the polymerization zone required in the preparation of the stable aqueous dispersion will vary widely dependent upon other process parameters employed. To prepare an aqueous dispersion containing 20–30 weight percent solids residence times in the range of from 10 minutes to 4 hours can be employed. Higher solids concentrations can be effected by employing the tertiary butanol recovery process step described above in concentrating the product aqueous dispersion recovered from the polymerization reactor.

Unlike conventional emulsifying agents containing active hydrogens, the emulsifiers of the invention do not chain transfer and, therefore, result in the production of long polymer chains. It is within the scope of the invention to employ a combination of emulsifiers wherein one of the emulsifiers is a salt of a perfluoro fatty acid having at least 6 carbon atoms per molecule to obtain the degree of chain transfer activity necessary and the desired average degree of polymerization.

The product aqueous dispersions of polyethylene obtained by the invention are useful in sizing or filling paper and in the preparation of an "ironing aid" where the polymer's resistance to fusing during ironing will prevent polymer build-up and repeated use. The product aqueous dispersions can also serve as opacifiers in pigmentation applications.

The emulsifying agents of this invention are relatively expensive. Substantial process savings can be effected while obtaining the advantages of employing the novel emulsifying agents by substituting another emulsifying agent for the salt of a perfluoro fatty acid in the prepared polyethylene emulsion. The quantity of the nonionic emulsifying agent can be readily determined by employing conventional procedures such as described in U.S. Pat. 3,296,192. Conventional nonionic emulsifying agents which can be employed as substitute emulsifiers include the alkylphenoxy polyoxyethylene ethanol emulsifiers of U.S. Pat. 3,226,352.

Following the addition to the aqueous dispersion of polyethylene of a nonionic emulsifying agent in a quantity sufficient to cause emulsification of the polyethylene, the resulting admixture can be passed through an ion exchange zone containing a strongly basic anionic exchange resin. Suitable strongly basic anion exchange resins include conventional polystyrene-divinylbenzene alkyl quaternary amine resins such as the resins manufactured and distributed by Dow Chemical Company under the trade name of Dowex 1–X8.

Suitably the ion exchange medium in particulate form is enclosed within a vertical column. The above prepared aqueous admixture can be passed downwardly through the column in intimate contact with the ion exchange medium. When potassium perfluorooctanoate has been employed as the original emulsifying agent, and Dowex 1–X8 resin is employed as the ion exchange medium, the perfluorooctanoate ion is exchanged for the chlorine ion of the resin. A stable aqueous dispersion containing the nonionic emulsifying agent, dispersed polyethylene and potassium chloride is withdrawn from the ion exchange zone.

After utilization of the ion exchange medium in the ion exchange process step, the medium will become charged with the perfluorooctanoate ion. The ion exchange medium can be recharged and the perfluorooctanoate ion recovered therefrom by passing an aqueous solution of potassium chloride through the ion exchange zone. The perfluorooctanoate ion is exchanged for the chlorine ion and the effluent withdrawn from the ion exchange zone will contain potassium perfluorooctanoate.

The following example is presented to illustrate the objects and advantages of the invention. It is not intended, however, that the invention should be limited to the specific embodiments presented therein.

EXAMPLE

In this example potassium perfluorooctanoate is employed in the preparation of an aqueous dispersion of polyethylene. A one-gallon stainless steel Magne-Dash autoclave is charged with a solution comprised of:

Water—1900 g.
Perfluorooctanoic acid—58.7 g.
Potassium hydroxide—9.35 g.
Potassium phosphate $\cdot xH_2O$—8.4

The reactor is sealed, flushed three times with ethylene at 300–500 p.s.i.g. and heated to 80° C. An initiator solution comprised of 3.2 grams of potassium persulfate dissolved in 100 grams of water is injected into the autoclave by means of a Ruska pump. The pressure is then raised to 4500 p.s.i.g. by the introduction of ethylene into the autoclave. Additional ethylene is introduced into the autoclave sufficient to maintain the pressure above 4250 p.s.i.g. After 1.75 hours a latex containing 23.8 weight percent solids is recovered from the autoclave and concentrated in a rotary vacuum evaporator to a solids concentration of 40 weight percent.

By soap absorption the average particle diameter of the latex is determined to be 380° A. Polymer isolated from the latex by acid coagulation has a tensile strength of 1160 p.s.i. and an elongation of 47 percent as determined by ASTM D638–64T. The polymer contains no carbonyl groups as indicated by the absence of an absorption band in its infrared spectrum at 5.85 microns and is insoluble in Tetraline at 135° C.

The above analytical results demonstrate the effectiveness of the invention in the preparation of an aqueous dispersion of polyethylene having long polymer chains (high molecular weight) and that substantially no chain transfer activity occurred in the polymerization reaction.

Although the invention has been described with reference to specific materials, embodiments and details, various modifications and changes, within the scope of this invention, will be apparent to one skilled in the art and are contemplated to be embraced in the invention.

We claim:
1. A process which comprises polymerizing ethylene at effective polymerization temperatures and pressures in the presence of a major effective amount of an aqueous medium, a minor effective amount of water-soluble persulfate initiator, and a minor effective amount of salt of a perfluoro fatty acid having at least 6 carbon atoms per molecule, recovering therefrom a stable aqueous dispersion of polyethylene, introducing a nonionic emulsifying agent into said aqueous dispersion in an amount sufficient to maintain the aqueous dispersion of polyethylene stable in the absence of said salt of a perfluoro fatty acid, passing the resulting admixture through an ion exchange zone containing a strongly basic anion exchange resin, and recovering therefrom a stable aqueous dispersion of polyethylene substantially free of said salt of a perfluoro fatty acid.

2. The process of claim 1 wherein said anion exchange resin comprises a polystyrene-divinylbenzene alkyl quaternary amine and said salt of a perfluoro fatty acid comprises potassium perfluorooctanoate.

3. A process of producing a stable aqueous dispersion of relatively long chain polyethylene comprising:
   (a) polymerizing ethylene in the presence of an aqueous medium, from 0.1 to 0.45 part by weight per 100 parts by weight of water in said aqueous medium of a water-soluble persulfate initiator, and from 0.9 to 9 weight percent of said aqueous medium of a water soluble salt of a perfluoro fatty acid having at least 6 carbon atoms per molecule to form an aqueous dispersion of said polyethylene, said polymerizing occurring at a temperature in the range of about 70 to 90° C. and a pressure in the range of from about 1550 p.s.i. to about 4500 p.s.i.;

(b) introducing a nonionic emulsifying agent into said aqueous dispersion in an amount sufficient to maintain the aqueous dispersion of polyethylene stable in the absence of said salt of a perfluoro fatty acid;

(c) introducing the resultant admixture of said nonionic emulsifying agent and said aqueous dispersion into an ion exchange zone containing a strongly basic anionic exchange resin, thereby removing the perfluoro fatty acid ion groups therefrom; and (d) recovering from said ion exchange zone a stable aqueous dispersion of polyethylene substantially free of said salt of a perfluoro fatty acid.

4. The method of claim 3 wherein said salt of a perfluoro fatty acid is an alkali metal salt thereof.

5. The method of claim 4 wherein said salt of a perfluoro fatty acid comprises potassium perfluorooctanoate.

6. The process of claim 5 wherein said anion exchange resin comprises a polystyrene divinylbenzene alkyl quaternary amine.

7. The method of claim 3 further comprising introducing an aqueous solution of potassium chloride into said ion exchange zone and removing potassium perfluoro fatty acid therefrom.

8. The method of claim 3 wherein said non ionic emulsifying agent is an alkylphenoxy polyoxyethylene ethanol.

References Cited

UNITED STATES PATENTS

| | | | |
|---|---|---|---|
| 2,559,752 | 7/1951 | Berry | 260—29.6 |
| 2,580,325 | 12/1951 | Scott et al. | 210—24 |
| 2,685,577 | 8/1954 | Cerveny et al. | 260—94.9 |
| 3,226,352 | 12/1965 | Helin et al. | 260—29.6 |
| 3,296,170 | 1/1967 | Burkhart et al. | 260—29.6 |
| 3,380,945 | 4/1968 | Deex et al. | 260—29.6 |

FOREIGN PATENTS

| | | |
|---|---|---|
| 1,131,013 | 6/1962 | Germany. |

DONALD E. CZAJA, Primary Examiner

R. A. WHITE, Assistant Examiner

U.S. Cl. X.R.

260—29.6, 94.9